(12) United States Patent
Dagenais (10) Patent No.: US 9,808,899 B2
(45) Date of Patent: Nov. 7, 2017

(54) METHOD FOR MUTUALLY POSITIONING TUBES

(75) Inventor: Jean-Francois Dagenais, Cassis (FR)

(73) Assignee: SERIMAX, Mitry-Mory (FR)

( * ) Notice: Subject to any disclaimer, the term of this patent is extended or adjusted under 35 U.S.C. 154(b) by 483 days.

(21) Appl. No.: 13/978,985

(22) PCT Filed: Jan. 11, 2012

(86) PCT No.: PCT/FR2012/000022
§ 371 (c)(1),
(2), (4) Date: Aug. 27, 2013

(87) PCT Pub. No.: WO2012/095589
PCT Pub. Date: Jul. 19, 2012

(65) Prior Publication Data
US 2014/0013579 A1    Jan. 16, 2014

(30) Foreign Application Priority Data
Jan. 11, 2011  (FR) ...................................... 11 50231

(51) Int. Cl.
*B66F 3/00* (2006.01)
*B23Q 16/00* (2006.01)
*B23K 37/053* (2006.01)

(52) U.S. Cl.
CPC .......... *B23Q 16/00* (2013.01); *B23K 37/0533* (2013.01); *Y10T 29/49826* (2015.01);
(Continued)

(58) Field of Classification Search
USPC ..................... 254/105, 133 R, 134
See application file for complete search history.

(56) References Cited

U.S. PATENT DOCUMENTS 3,257,099 A * 6/1966 Merritt, Jr. ................. E21B 7/20
                                                        254/105
3,598,369 A * 8/1971 Yielding ................. E21B 19/00
                                                        254/106

(Continued)

FOREIGN PATENT DOCUMENTS

| EP | 0 112 752 | 7/1984 |
|---|---|---|
| WO | 2006 112689 | 10/2006 |
| WO | 2010 046390 | 4/2010 |

OTHER PUBLICATIONS

International Search Report dated Sep. 13, 2012 in PCT/FR12/000022 Filed Jan. 11, 2012.

*Primary Examiner* — Joseph J Hail
*Assistant Examiner* — Shantese McDonald
(74) *Attorney, Agent, or Firm* — Oblon, McClelland, Maier & Neustadt, L.L.P.

(57) ABSTRACT

A method for mutually positioning tubes. End faces, which includes a generally annular and generally circular end surface near an inner surface of the tube and a beveled edge surface connecting the end surface to an outer surface of the tube, are provided on first and second tubes, respectively. Plural clamping cylinders are engaged with the first and second tubes, respectively. Each cylinder is radially arranged onto and evenly distributed around respective tubes. The first and second tubes are pre-positioned relative to each other such that their respective end faces are opposite each other. At least one radial offset is assessed between the respective end surfaces of the first and second tubes. The clamping cylinders of the first and/or second tube are moved relative to each other in accordance with the assessed radial offset based on an optimization of areas in which their respective end surfaces coincide.

3 Claims, 6 Drawing Sheets

(52) U.S. Cl.
CPC .... *Y10T 29/49899* (2015.01); *Y10T 29/49902* (2015.01); *Y10T 29/49998* (2015.01); *Y10T 29/53978* (2015.01)

(56) References Cited

U.S. PATENT DOCUMENTS

| | | | |
|---|---|---|---|
| 4,565,003 A * | 1/1986 | McLeod | B23K 37/0533 228/49.3 |
| 2005/0087586 A1 * | 4/2005 | Vermaat | B23K 37/0533 228/212 |
| 2008/0193218 A1 | 8/2008 | Verkuijl et al. | |
| 2011/0198316 A1 | 8/2011 | Legori et al. | |
| 2012/0174372 A1 | 7/2012 | Dagenais | |

* cited by examiner

METHOD FOR MUTUALLY POSITIONING TUBES

BACKGROUND OF THE INVENTION

Field of the Invention

The invention relates to the field of mutual positioning of tubes and, more precisely, of tubes which are to be joined end to end, for example by welding. In general terms, the tubes are first of all aligned at their end faces, then held in this position to be welded together.

Various processes and apparatus may be used for this purpose.

Description of the Related Art

Cramps are known comprising an annular flange carrying screw jacks fixed so that their respective rods extend beyond the flange, towards the interior thereof.

The annular flange is generally made in two parts, each in the form of a half-ring. The parts are jointed to one another by a hinge. They may be spaced from one another in order to position the flange around a tube and remove it therefrom. The parts of the flange may be brought closer to one another until the flange is in a closed position. The parts may be secured in this position and thus hold the flange on the tube. The jacks may be controlled so as to deform the tube and/or move the latter relative to the flange. The cramp makes it possible to position the tube that it supports relative to another tube in order to align these tubes to an optimum degree. The term "align" here should be interpreted in a broad sense: it refers to placing the tubes in a mutual position which is the most suitable for butt-welding them together, while taking account of their variations in shape and dimensions, without necessarily seeking to place them in the same line. This mutual positioning of the tubes may include mutual adaptation of the outer profiles of the tubes close to their ends that are to be joined, by deformation of one and/or other of the tubes.

The screwing of the jacks makes it possible to apply pressure at points on the outer surface of the tube engaging in the cramp, at as many zones as there are jacks on the flange. This makes it possible to deform the tube, for example in order to improve its circularity or to cause its external profile to correspond to the outer profile of a homologous tube.

It may be that a respective cramp is positioned on each of the tubes to be placed end to end, so as to have greater freedom of positioning. Thus, a better matching of the end surfaces or edges may be obtained by successively and respectively deforming the ends of each tube. In this way, better welding can be achieved.

The cramps also enable one tube and/or the other to be clamped and held in the welding position.

A method of mutually positioning tubes is also known from the document WO 01/34340, wherein the tubes are each externally engaged with a respective clamping assembly, the clamping assemblies being mounted on a common rigid frame. Once the ends of the tubes have been welded to one another, the frame is moved relative to the outer surface of one of the tubes in the direction of the opposite end of this tube, where a new weld is to be carried out.

Only the general shape and external diameter of one of the tubes are taken into account for adjusting the positioning and clamping of the other tube. This process permits only approximate clamping and mutual positioning of the tubes.

When welding tubes it is important to have an excellent shape match between the ends of each tube and to position them facing one another or, as far as possible, in contact with one another.

The manufacturing tolerances mean that the inner and outer contours of the tubes are not necessarily concentric. In fact, the majority of known processes set out to match the outer contours of the tubes that are to be welded.

The inner surface of a tube also has geometric and dimensional imperfections. In order to make the ends of the tubes that are to be joined end to end suitable for welding, the end faces of the tubes may be machined beforehand. This machining may comprise an operation of straightening an end face, producing a so-called inner bevel connecting the end face to the inner wall of the tube, and/or producing a so-called outer bevel connecting the end face to the outer surface of the tube.

Generally, this machining operation is carried out with a tool for copying the inner profile of the tube adjacent to its end. Thus the inner and/or outer bevels produced at the end of a tube follow the inner profile of the tube in question but also reproduce its imperfections, particularly the imperfections connected with the variations in tolerances.

Positioning the tubes by seeking to align their inner surfaces also proves to be unsatisfactory. It results in welds with defects, particularly for tubes having bevelled ends, with root faces.

A tube with a bevelled end most often has an end face with a generally frustum-shaped surface—the bevel itself—connecting the outer surface of the tube to a generally annular surface of substantially straight or concave cross-section, close to the inner surface of the tube. This annular surface, which corresponds to the end face, may be referred to as a "root face" in the art.

The end face of a tube with a bevelled end may have no annular surface: the generally frustum-shaped surface is then also attached to the inner surface of the tube. In other words, the end of the tube in this case is reduced to an edge at the intersection of the inner surface of the tube and the bevel.

The respective end edges or end surfaces of the tubes are intended to form a base, or root, for the weld bead, whereas the bevels delimit a zone which has to be filled to form the weld bead.

The aim of the correct positioning of the tubes should be to bring the root faces, or the edges, into alignment. Because of the errors of shape and dimensions linked to the manufacture of the tubes, the known processes are unable to achieve this.

It is known to arrange cramps inside the tubes that are to be joined end to end in order to obtain an alignment, in two concentric circles, of the ends of the jacks once they have been deployed and brought into spot contact with the surface of the tubes that are to be joined end to end, close to their respective ends.

When the jacks of a cramp are deployed, their rods are all moved by the same distance and the ends of these rods are inscribed in a quasi-perfect circle with the manufacturing tolerances of the cramp.

However, such a process cannot guarantee a coincidence of the shape of the ends of the two tubes that are to be joined together over their entire periphery.

BRIEF SUMMARY OF THE INVENTION

The invention sets out to improve the situation, and in particular to position two tubes facing one another so that their root faces or end edges have a larger coincidence surface.

A process for the mutual positioning of tubes is proposed, in which is provided, on a first tube and a second tube, a respective end face comprising a generally annular end surface or a generally circular end edge, close to an inner surface of the tube, and a bevel surface connecting the end surface or the end edge to an outer surface of the tube, and the first and second tubes are moved relative to one another so as to position the end faces of these tubes relative to one another. The proposed process comprises the steps of engaging a plurality of clamping jacks on the first tube and second tube, respectively, each jack being arranged radially of its respective tube, the jacks being regularly distributed about their respective tubes, the first and second tube being pre-positioned relative to one other so that their respective end faces are opposite one another, evaluating at least one radial offset H, H' between the respective end faces or end edges of the first and second tube, and controlling the clamping jacks of the first and/or second tube in order to move them relative to one another as a function of the radial offset or offsets H, H' evaluated on the basis of optimising the coincidence zones between the respective end surfaces or end edges of said tubes.

The proposed process makes it possible to refine the matching between the contact surfaces or geometries of the tubes that are to be welded, at their joint plane. The process makes it possible to improve the coincidence of the end surfaces of the tubes. This ensures better setting of the first welding pass.

The end surface may have a substantially annular form, of a certain thickness. This end surface is sometimes referred to as the "root face" in the art.

Additional, complementary and alternative features are described hereinafter:

The radial offset H, H' is assessed visually.

The radial offset H, H' is evaluated using specific sensors, and radial offset values are sent to a central computer unit, this central computer unit being capable of processing these values to control the movement of some or all of the jacks.

In the step of evaluating the radial offset, the latter is evaluated in the form of one or more radial offset values between the respective edges of the first and second tubes, each edge forming a junction between the inner surface of its respective tube and the end surface of this tube.

In the step of evaluating the radial offset, the latter is evaluated in the form of one or more radial offset values between the respective edges of the first and second tubes, each edge forming a junction between the bevel surface of its respective tube and the end surface of this tube.

In the step of evaluating the radial offset, the latter is evaluated in the form of one or more radial offset values between the respective edges of the first and second tubes, each edge forming a junction between the bevel surface of its respective tube and the inner surface of this tube.

The engagement step comprises the operations of engaging a first set of clamping jacks on the outer surface of the first tube, moving the second tube relative to the first tube into a position of alignment where the end face of the second tube is approximately aligned with the end face of the first tube, engaging a second set of clamping jacks on the outer surface of the second tube in this position of alignment.

The jacks of the first and/or second set are controlled so as to reduce the overall radial offset between the end surfaces or end edges, while seeking to adhere to a maximum radial offset value on these end surfaces or along the end edges.

In the pre-positioned state, the outer surfaces of the first and second tube are mutually spaced by a few millimeters in the longitudinal direction of one and/or the other of these tubes.

The clamping jacks are individually controlled so as to allow a relative displacement of the ends of the tubes while maintaining the engagement forces of said jacks on said tubes.

The first and/or second tube is moved relative to the other until a coincidence surface is obtained which amounts to between 20% and 100% of the end surface of the first and/or second tube.

The jacks remain locked in an engagement position and maintain the forces applied to the first tube and/or to the second tube when the optimum coincidence position is obtained.

The step of controlling the jacks comprises at least one sub-step in which the movement of at least one of the jacks is controlled independently of the movement of the other jacks so as to locally modify the radial offset H, H' between the end surfaces or the end edges.

The step of controlling the jacks comprises the sub-steps of jointly controlling the jacks so as to move the first tube and the second tube relative to one another while reducing overall the radial offset between the end surfaces or the end edges of these tubes, and of individually controlling at least one of the jacks differentially in relation to one or more antagonistic jacks so as to locally deform its respective tube and reduce a particular radial offset.

A cramp is used comprising two homologous flanges mounted one on the other, one of the flanges supporting part of said plurality of jacks, while the other flange supports the remainder of said plurality of jacks.

A device is also proposed for mutually positioning tubes comprising a cramp having two homologous flanges mounted one on the other, one of the flanges supporting a first set of hydraulic jacks, while the other flange supports a second set of hydraulic jacks, the jacks of at least one of the first set of jacks and of the second set of jacks each being associated, on the one hand, with a solenoid valve which can be controlled so as to supply the jack with fluid and, on the other hand, with a proportional-type pressure regulator which can be made to control the output of the jack.

The device may further comprise a hydraulic generator comprising a plurality of hydraulic pump units, each jack of at least one of the first and second set of jacks being connected to a respective pump element.

BRIEF DESCRIPTION OF THE SEVERAL VIEWS OF THE DRAWINGS

Further features, details and advantages of the invention will become apparent from reading the description that follows, referring to the attached Figures, wherein.

DETAILED DESCRIPTION OF THE INVENTION

The attached drawings contain elements of a specific nature and in this capacity may not only serve to complete the invention but may also contribute to its definition in certain circumstances.

Identical or similar components are marked by identical reference numerals throughout the Figures.

Figure 1:
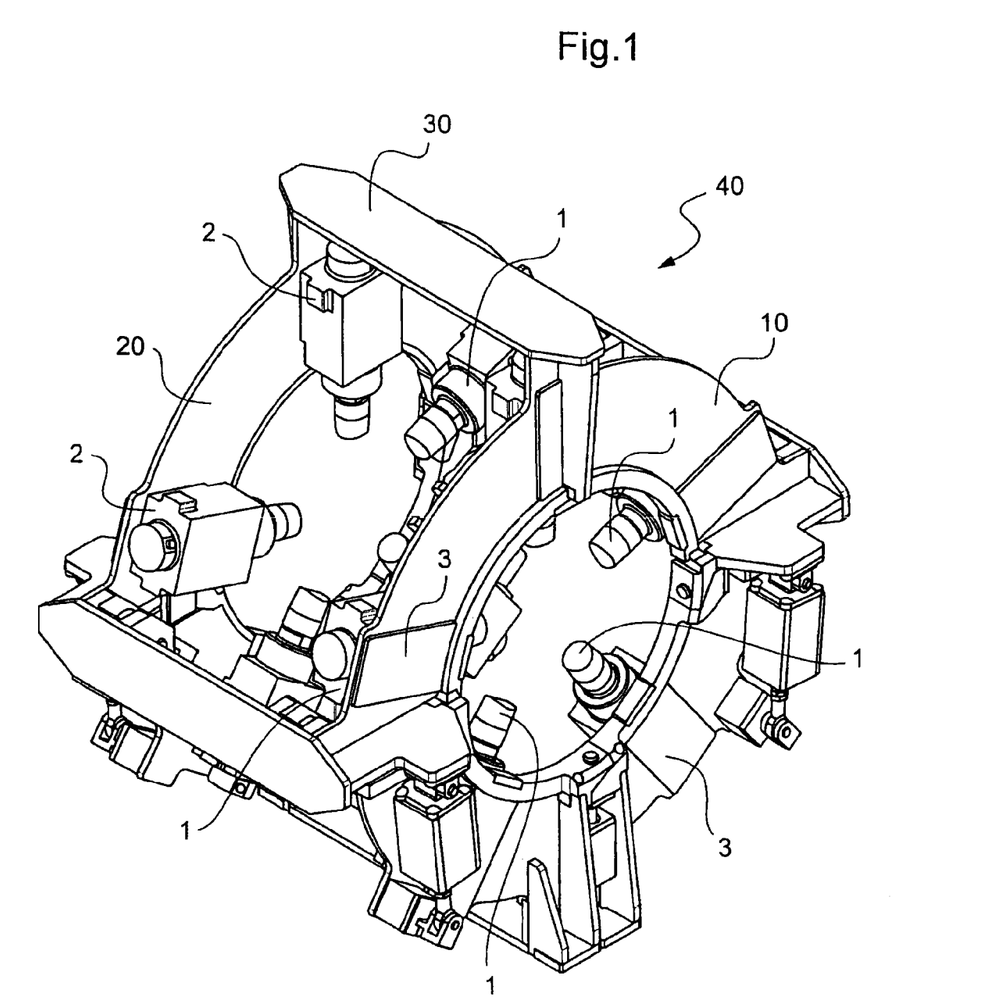
FIG. 1 is a simplified perspective view of a positioning cramp.

Reference will be made to FIG. 1.

This shows equipment for assisting with the positioning of tubes, in the form of a cramp 40.

A first set of jacks 1, five in this case, is fixed to a first annular flange or support 10, while a second set of jacks 2, five in this case, is fixed to a second annular flange 20. The first flange 10 and the second flange 20 are arranged opposite one another, in a substantially concentric manner. They are securely held in this relative position by connecting members or braces 30. Each jack of the first set 1 is located opposite a jack of the second set 2, or homologous jack, and vice versa. The first set of jacks 1 and the second set of jacks 2 are intended to be disposed in alignment with, respectively, a first tube and a second tube that are to be positioned relative to one another, close to their adjacent ends. In other words, the jacks of the first set 1 are intended to be distributed about the first tube, whereas the jacks of the second set are intended to be distributed about the second tube.

Reinforcing plates 3 are fixed here to the first flange 10 and/or the second flange 20, in each case in line with the jacks of the first set 1 and/or the second set 2. This makes it possible to reinforce the flanges. The number, dimensions and make-up of the reinforcing plates 3 may vary as a function of the type of forces applied to the structure. Here, the jacks 1, 2 are of the double-acting hydraulic type. They are preferably coupled to a hose (not shown) by a connector such as a quick-release coupling.

Each jack 1 has a movement sensor, which is internal (not visible) in this case, and which can be connected to a central control and processing unit. These precision travel sensors may be of the magnetostrictive type, for example having a resolution of 0.05 mm and a precision of 0.1 mm. These sensors are capable of transmitting corresponding data to the computer. These data correspond to position data for locations on the surface of tubes, in relation to a reference position in which the jack rod is fully retracted.

These sensors are optional. They may be replaced by distance sensors placed so as to measure the distance between the framework and the outer surface of the tube on which the frame is mounted.

Solenoid valves cooperate individually with each jack 1 so as to supply a suitable, controlled pressure or volume of fluid. Each jack is associated with a solenoid valve, in this case of the impulse type. Alternatively the solenoid valves could be of the proportional type.

Each jack is associated here with two pressure sensors, one sensor respectively for each of the chambers of the jack. This makes it possible to discover the thrust force on the rod, from the measurement of the difference in pressure between the two chambers of the jack.

Each jack has one or more inlets and one or more outlets (not shown), at least one of the inlets and at least one of the outlets being connected to a flexible conduit that will withstand a pressure of 200 to 800 bars, for example a quick-release coupling.

This conduit is itself connected to a hydraulic supply generator. This supply generator comprises at least one fluid pump. Preferably, it comprises one pump for each solenoid valve, in which case the pumps may be mounted on a common drive shaft. Variable flow pumps may be used to optimise the cycle times. A common pump may be used for the first set of jacks 1 and the second set of jacks 2, the pump being adapted to be switched in order to supply one or other of the sets of jacks in question.

Each jack is associated with a proportional-type pressure regulator which is controlled so as to govern the output of the jack in question. This regulator may form a single component with one of the two pressure sensors described hereinbefore.

The number of jacks that are provided on the flanges may vary as a function of the technical constraints such as, in particular, the space available, the forces at work, the costs, or the diameter of the flange in question.

Preferably, particularly for offshore welding operations, reinforced hydraulic jacks are chosen which can withstand, on their rods, a radial force of the order of 20 percent of their total capacity (longitudinal force). In this type of application, in fact, during the welding, the pulling forces applied to the tubes may be considerable. They are commonly of the order of several tens of tonnes. The relative movements of the tubes may also be substantial. The device according to the invention is operational and reliable in spite of these difficult operating conditions.

The rod of each jack is fitted with a shoe at its end.

The shoe on the rod of the jacks of at least one of the first set of jacks 1 and of the second set of jacks 2 is pivotably mounted. This shoe may also be equipped with loosely mounted rotary rollers.

The Applicant has produced a device according to the cramp in FIG. 1. Five hydraulic jacks have been fixed to each flange 10, 20. Each jack works under a pressure of 200 to 800 bars, has a thrust capacity, along its longitudinal axis, of 1 to 50 tonnes, or even up to 200 tonnes, a pulling capacity, radially with respect to its longitudinal axis, of 1 to 10 tonnes, or even up to 50 tonnes, and a travel of 30 to 100 millimeters. Each jack comprises an internal movement sensor which has a precision of 0.05 millimeters and a resolution of 0.05.

The supply circuit of each jack chamber comprises a pressure sensor which makes it possible to determine precisely the bearing force on the outer surface of a tube. The precision in question may be close to 1000 kPa with a resolution of about 500 kPa. The sensors are together connected to a processing and control unit comprising, for example, a microcomputer or a programmable logic controller, for example of the type known under the name "Control Logix", made by the company Allen Bradley.

The invention relates to a method for mutually positioning a first tube and a second tube with the aim of joining them together by welding at their end faces.

The jacks of a first set of jacks are positioned close to the end of a first tube, around this tube. They may be jacks 1 of the cramp 40.

The jacks may be fixed to a common support, for example the flange 10 in FIG. 1. Preferably, they are regularly angularly distributed about the first tube.

The jacks of a second set of jacks are positioned close to one end of a second tube, to be butt-welded to the first tube. These may be the jacks 2 of the cramp 40.

The jacks of the second set may be fixed to a common support, for example the flange 20 in FIG. 1. The jacks 2 are preferably regularly angularly distributed about the said end of the second tube.

The first jacks 1 and the second jacks 2 may be connected to one another, spaced from one another in the axial direction of the tubes that are to be positioned; by connecting means such as bars, yokes or the like provided so as to define a space for example through which welding means or other suitable equipment may pass. They may be of a fixed length or of variable length to make it possible to regulate the spacing between the ends of the tubes that are to be positioned. The means may be similar to the braces 4 in FIG. 1.

The flanges 10, 20 may be provided in several parts so as to assume a closed position in which they form a continuous ring around the ends of the tubes and an open position in which one or more parts assume a spaced position, compared with the annular closed position. Means such as hinges then enable the movable parts to be pivotably connected to the fixed parts. Of course, an arrangement of this kind allows engagement or disengagement of the ends of the tubes relative to the equipment, either for positioning them before welding or for removing them after welding.

The process may use the device described above, in which each flange is in two or more pieces, or all in one piece.

Figure 2A:
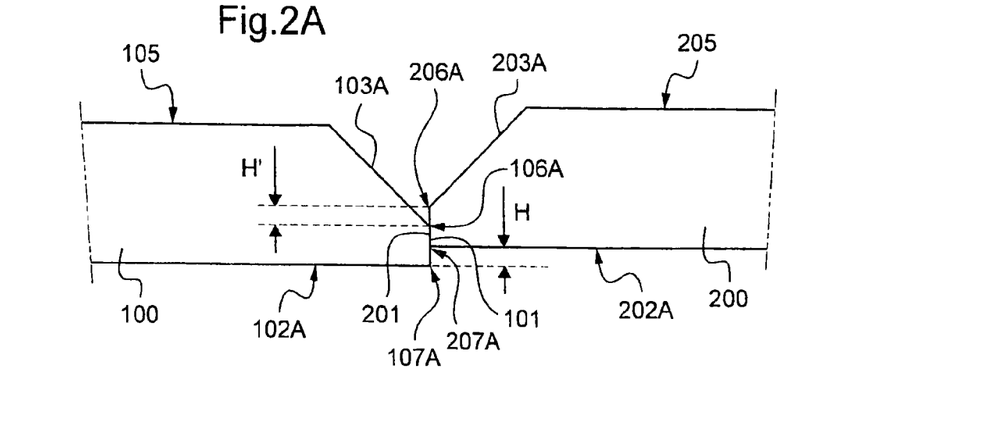
FIG. 2A shows, in longitudinal section, two end portions of tubes in a first configuration.

Reference will now be made to FIG. 2A.

This shows the respective end portions of bevelled tubes 100, 200 comprising respective root faces 101, 201, each in the form of a generally annular flat surface arranged substantially perpendicularly to the axis of its respective tube. The root faces 101 and 201 form the respective end faces of the tubes 100 and 200.

The end portions of the tubes 100, 200 comprise respective bevels 103A, 203A, each in the form of a generally frustum-shaped surface attached on the one hand to the outer surface 105, 205 of its respective tube and, on the other hand, to the root face 101, 201 of this tube at a so-called "outer" edge 106A, 206A. Each root face 101, 201 is connected to the inner surface of its respective tube at a so-called "inner" edge 107A, 207A. Here, the bevels 103A, 203A are inclined at approximately 45° to the inner surface of their respective tubes.

Figure 2B:
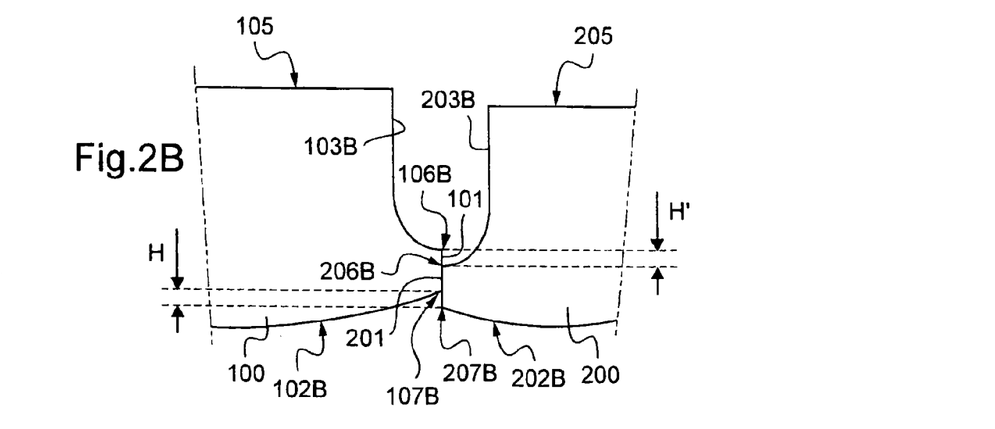
FIG. 2B is analogous to FIG. 2A, the portions having a second configuration.

Reference will now be made to FIG. 2B.

The bevels 103B, 203B have a J-shaped radial profile. In other words, each bevel has a first, generally planar surface which extends substantially perpendicularly to the outer surface 105, 205 of its respective tube, and a second, curved, surface which connects the first surface to the root face 101, 201 of the tube, tangentially in each case.

The respective inner surface 102B, 202B of the tubes 100, 200 is slightly inclined relative to the longitudinal axis of the tube. This inclination is of the order of a few degrees. It is typically between 1° and 20°. This inclination of the inner surface 102B, 202B results from a machining, for which an end portion of the inner surface of the tube acts as a reference.

Figure 2C:
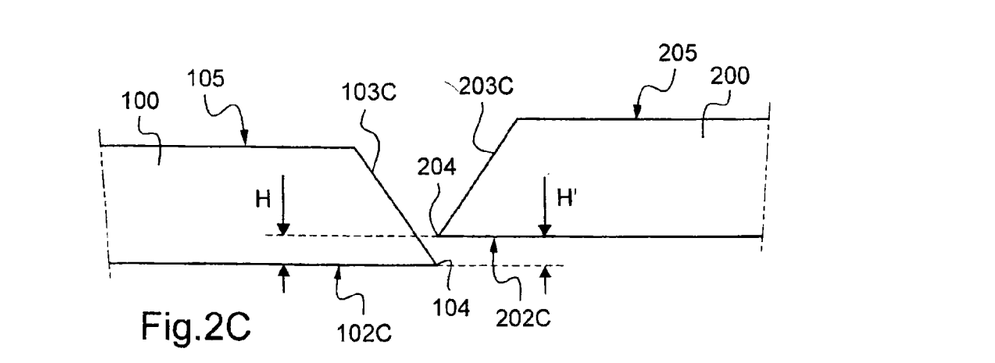
FIG. 2C is analogous to FIG. 2A, the portions having a third configuration.

Reference will now be made to FIG. 2C.

Here, the end portions of the tubes 100, 200 have bevels 103C, 203C respectively, each in the form of a frustum-shaped surface which is directly connected to the inner surface 102C, 202C of the tube at a single edge 104, 204. The end portions of the tubes 100, 200 have no root face. In other words, these are lines, the single edges 104 and 204, which form the facing ends of the tubes 100, 200.

The unfinished tubes generally have bevels inclined at about 30° to the end surface of the tube. These bevels may be re-machined or not.

Shapes of end portions of common tubes have been described, purely by way of example. The invention may be applied to bevels and more generally end portions of different shapes of profiles.

The intention is to adjust the mutual position of the tubes 100, 200 by engaging their outer surface 105, 205, close to their ends, and moving and/or deforming them so as to obtain optimal coincidence of the end surfaces for the purpose of welding them. No precise dimensions of the tubes are known before the positioning according to the invention. The tubes to be processed have geometries and dimensions that are similar to one another and which correspond, at least for some of them, to nominal dimensions that are similar, i.e. apart from the manufacturing tolerances.

Figure 4:
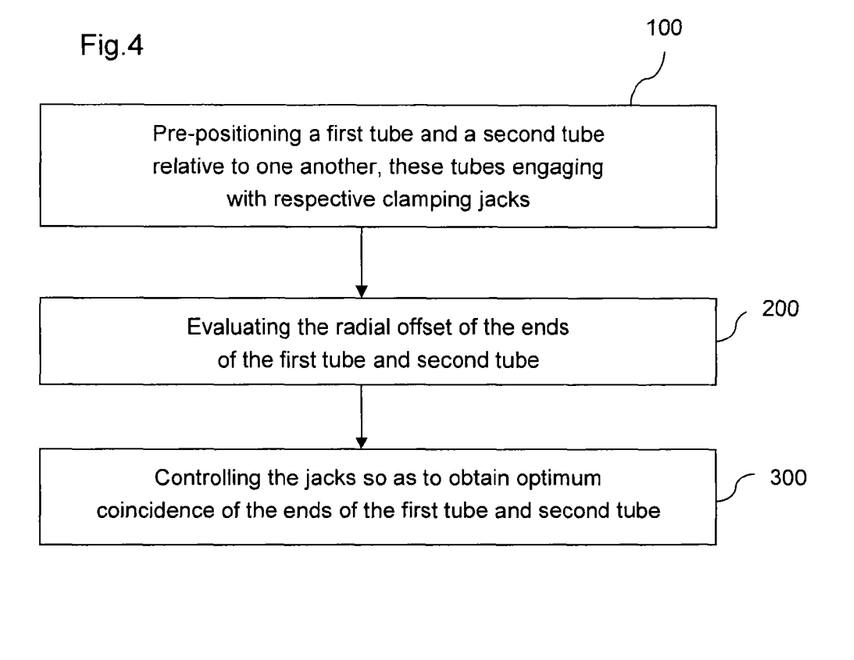
FIG. 4 is a flow diagram showing a method of mutually positioning tubes.

Reference will now be made to FIG. 4.

The process begins with a step 100 of mutual pre-positioning of the tubes. This pre-positioning is based on what could be termed a rough alignment of the outer surfaces of the tubes 100, 200 close to their respective ends.

Figure 5:
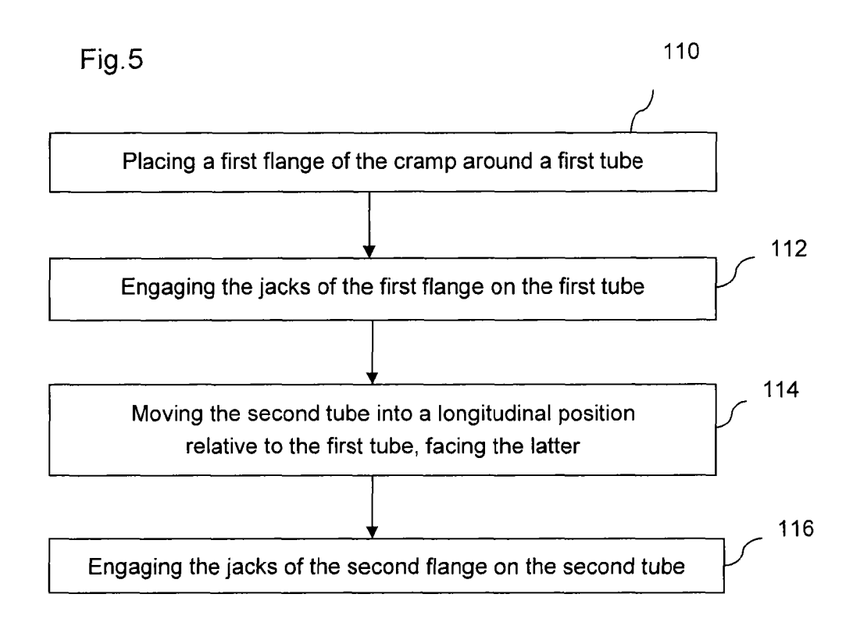
FIG. 5 is a flow diagram that details a step 100 in FIG. 4 according to a first alternative embodiment of the positioning process.

Reference will be made to FIG. 5 which shows a first variant of the mutual pre-positioning of the tubes.

In a step 110, a cramp equipped with jacks is placed on an end portion of one of the tubes. The cramp may for example be analogous to the cramp 40 in FIG. 1. The cramp may be positioned by moving retractable sensing means (not shown) fixed to the cramp into abutment on the outer surface of this first tube.

In a step 112, the jacks of this cramp are actuated to clamp the first tube, i.e. to engage with the outer surface thereof. The first tube is then in its welding position. In this step of pre-positioning of the cramp on the first tube, the first jacks 1 are moved closer to the outer surface of the first tube 100 then tightened against it, concentrically with the frame. The rods of the jacks are advanced concentrically at the same speed for the same length of time, while their movement is measured.

The speeds and distances of movement can be set.

In an approach phase, the speed of advance of the jacks may reach 6 mm/s.

Close to the outer surface of the first tube 100, the speed may be reduced, for example to 0.3 mm/s, in order to control the movement of the jacks with more precision. The movements of each of the jacks 1 distributed around the end of the first tube 100 are synchronised precisely.

Once this clamping has been completed, it is still possible to control each of the jacks independently in its bearing force and travel. In this way the clamping and final positioning of the tube end or ends can be optimised, as well as the profile of the end section.

When the jacks 1 have sufficiently clamped the first tube by its exterior, i.e. when a predetermined clamping pressure value is achieved, for example 1.5 tonnes per jack, the advance of the jacks is stopped.

In a step 114, the second of the tubes is brought inside the cramp, to the second flange, so that its end is opposite the end of the first tube. The second tube is best positioned by taking bearings from the outer surfaces of the ends of the two tubes and bringing the respective root faces of the end surfaces of the first and second tube into contact with one another.

In a step 116, the jacks of the second cramp engaging the outer wall of the second tube are actuated.

Figure 3A:
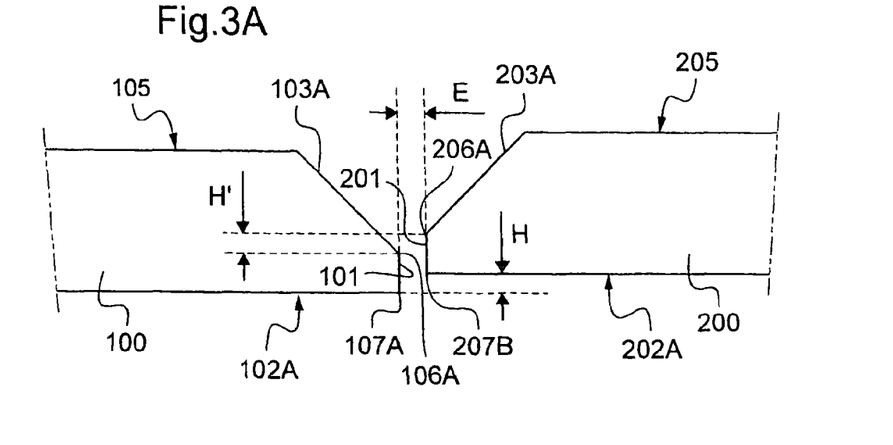
FIG. 3A is analogous to FIG. 2A, the portions having a fourth configuration.
Figure 3B:
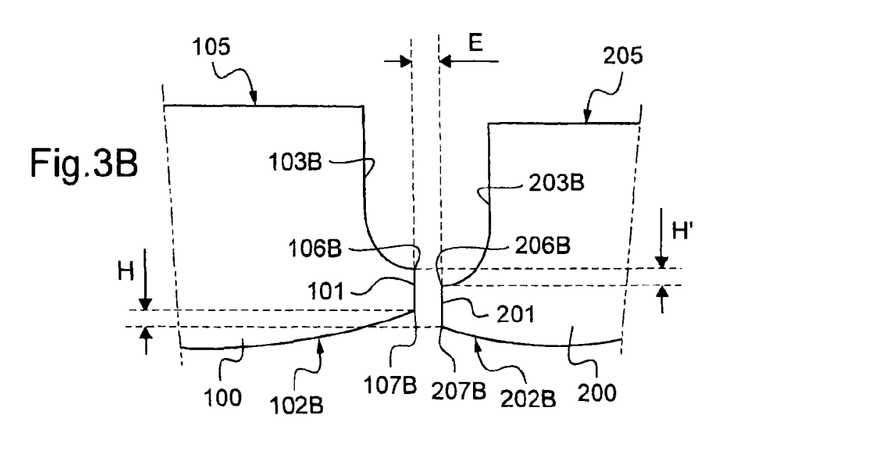
FIG. 3B is analogous to FIG. 2A, the portions having a fifth configuration.
Figure 3C:
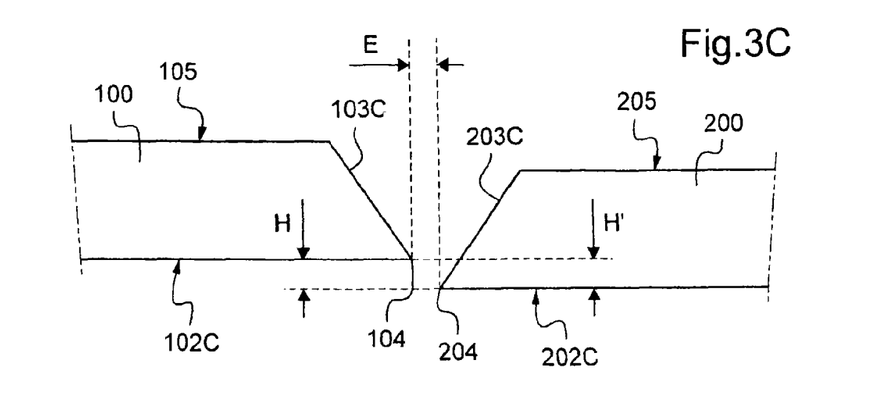
FIG. 3C is analogous to FIG. 2A, the portions having a sixth configuration.

The end of the second tube 200 is brought into contact with that of the first tube 100. Alternatively, the ends of the tubes may be arranged so that there is a specified longitudinal spacing E between them, as shown in FIGS. 3A, 3B and 3C.

The spacing E depends on the welding process used. For example, in the case of manual welding, the value of E may be fixed between 1 and 4 mm, typically around 2 mm.

In the case of automatic welding, using MIG, MAG or TIG torches, for example, a value of E of between 0 and 0.5 mm may be envisaged.

The jacks of the second set 2 are brought into clamping engagement with the exterior of the second tube 200, in an analogous manner to that used for the jacks of the first set of jacks 1.

The speeds and distances of movement of the jacks, i.e. of their rods relative to the body, can be set.

In an approach phase, the speed of advance of the jacks may reach 6 mm/s, for example.

Close to the outer surface of the first tube 100, the speed may be reduced, for example to 0.3 mm/s in order to control the movement of the jacks with more precision. The movements of each of the jacks 1 distributed about the end of the first tube 100 are synchronised precisely.

Once this clamping has been completed, it is still possible to control each of the jacks independently in its bearing force and travel. This makes it possible to optimise the clamping and the final positioning of the end or ends of the tubes, as well as the profile of the end section.

Figure 6:
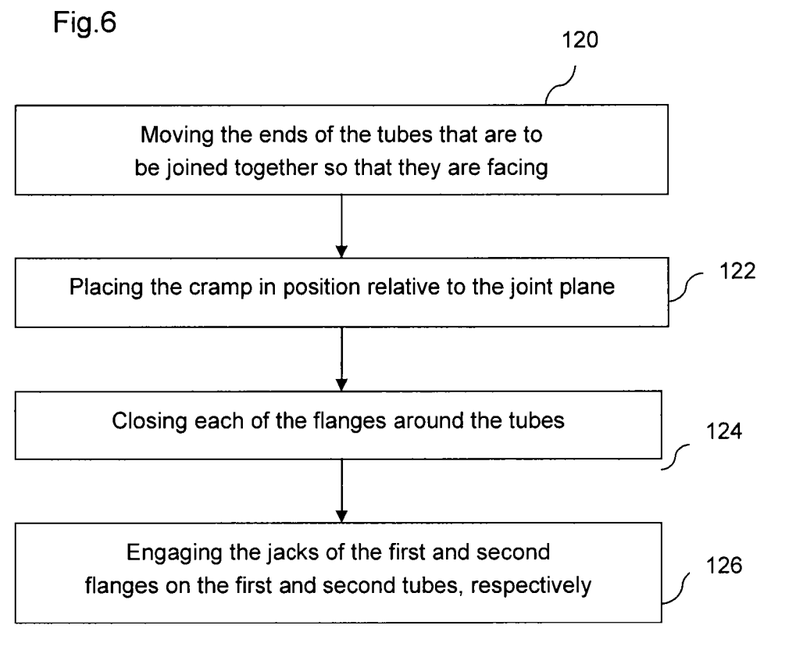
FIG. 6 is a flow diagram that details the step 100 in FIG. 4 according to a second alternative embodiment of the positioning process.

Reference is made to FIG. 6, which shows a second alternative embodiment of the mutual pre-positioning of the tubes.

In a step 120, the ends of the two tubes that are to be assembled are placed facing one another, generally in mutual contact, by means of equipment that is independent of the cramp 40. Alternatively, the end surfaces of the tubes are moved away from one another by a distance E as described hereinbefore.

The cramp 40 is in the open position of the flanges.

In a step 122, the cramp is placed in position relative to the joint plane.

In a step 124, each of the flanges is closed around the tubes.

In a step 126, the outer surface of the first tube is engaged, in a similar manner to that described hereinbefore. Also, the outer surface of the second tube is engaged, in a similar manner to that described hereinbefore.

Optionally, the longitudinal position of the cramp is adjusted by means of sensors as described previously, before the clamping is carried out with the first and second tubes 100, 200.

Reference will again be made to FIG. 4.

At the end of step 100, the end faces of the tubes 100, 200 are in a roughly aligned position determined by the relative positioning of the outer surfaces of the tubes 100 and 200 close to their respective ends.

During a step 200, the radial offset of the end surfaces 101, 201 of the tubes 100, 200 is evaluated.

The misalignment between the respective end surfaces 101, 201 of the first tube 100 and second tube 200 may be evaluated in the form of at least one radial offset value H' between the outer end edges 106, 206, i.e. by the exterior of the tubes.

Alternatively, the misalignment between the respective end surfaces 101, 201 of the first tube 100 and second tube 200 could be evaluated in the form of at least one radial offset value H between the inner end edges 107, 207, i.e. by the interior of the tubes.

The variables H and H' correspond to what is known in the art as a "Hilo".

Preferably, a number of offset values H or H' are evaluated, taken at a number of points on the circumference of the inner edge 107, 207 or outer edge 106, 206 of the tubes 100, 200.

Preferably, the outer edge at the measuring points accessible from the outside is used as a reference, since, as a result of the machining by engagement with the inner surface and the copying roller that follows it, the offset H is equal to the offset H'.

The radial offset H' can easily be measured from the outside of the tube. This measurement may be carried out by an operator, for example equipped with a calliper gauge, and/or one or more sensors.

The radial offset H' may be monitored visually. An operator can then control the jacks 1, 2 manually to move one and/or the other of the tubes 100, 200. The movement may be pulsed or continuous.

The evaluation of the radial offset H' or H may use one or more sensors of the laser profilometer type mounted on a welding carriage, with a profilometric camera, or image processing methods or sensors.

Reference will once again be made to FIG. 4. In a step 300, the jacks of the cramp are actuated so as to move the tubes mutually and/or deform them so as to optimise the coincidence of the end surfaces 101, 201.

Using the operational jacks, the end surface of the second tube 200 is moved in a plane parallel to the joint plane relative to the first tube 100 which remains fixed in relation to the cramp 40. It is also possible to envisage moving both the first tube 100 and the second tube 200 relative to the cramp 40 at the same time.

The relative movements of the jacks may preferably be carried out by pulses controlled and monitored by an operator and converted into a trajectory by a computer. These movements may also be steered by a computer such as a programmable logic controller, on the basis of measurements carried out during the phase of bringing the 2 tubes into a position facing each other, these measurements being carried out for example by means of additional sensors mounted on the equipment.

The pulses may allow movements, in manual mode, of from 0.1 mm to 1 mm.

By reducing the offsets H or H', it is ensured that the end surfaces 101, 201 coincide as much as possible, i.e. so that a maximum contact surface or facing surface is obtained.

This optimisation of the coincidence of the surfaces can be achieved in manual operation by visual qualitative assessment by the operator or, in automatic operation, by the computer. If necessary, one or more measurements may be repeated after clamping and the first controlled movements of the jacks.

The aim is to achieve a final position of the jacks which corresponds to an optimisation of the coincidence zones between the end surfaces or the end edges of the tubes. This optimisation corresponds to a minimising of the sum of the values of H, H' evaluated previously, while ensuring a minimal coincidence surface around the periphery of the tubes, i.e. radial offset values H or H' which are below a maximum permitted Hilo value, for example of the order of one millimeter. An optimum Hilo value is typically approximately 0.5 mm, while values of around 1.5 mm are acceptable. Alternatively, attempts could be made to achieve a uniform radial offset over the circumference of the tubes.

In practice, the work may be done in two stages. First of all, the jacks are moved so as to shift the tubes relative to one another, without deformation. Then, one and/or the other of the tubes may be deformed at individual points so as to reduce still further the sum of the radial offsets or retrieve a radial spacing that is greater than the others.

When the end surfaces are in the optimum mutual position, the jacks are fixed.

In the case of bevels with no root faces, the radial offsets H and H' between the end lines or edges 104, 204 are reduced as much as possible.

After the position of the jacks has been fixed, a set of measurements of the radial offset H and/or H' may be carried out. If the coincidence between the annular surfaces is not thought to be sufficient, by the operator or by the computer, iterative movements of at least one of the tubes 100, 200 in the joint plane may be carried out.

Reference is made to FIGS. 3A, 3B and 3C.

The ends of the first and second tubes 100, 200 are shown in configurations that are analogous to FIGS. 2A, 2B and 2C, respectively, except that the end surfaces 101 and 201 and the end edges 104 and 204 are mutually spaced apart by a distance E measured along the longitudinal axis of the tubes 100, 200. This position corresponds to the final axial position before welding.

The positioning process described above is also applicable in the case shown in FIGS. 3A, 3B and 3C, where a longitudinal spacing E is intentionally maintained between the end surfaces 101, 201 of the tubes 100, 200.

During the mutual displacement of the tubes 100, 200, certain jacks may have a recoil or retracting movement, while providing a constant bearing force on the end in question.

The mutual positioning of the tubes 100, 200 involves moving these tubes relative to one another while maintaining a clamping, or engagement, force between the cramp and the tube that has been moved. This requires each jack and one or more of the jacks opposite it (antagonistic jacks) to be capable of being moved jointly without losing the clamping force. In order to move a tube in a direction corresponding to a jack, the pressure of the jack in question is controlled, while its antagonistic jack or jacks is or are controlled in their output to a force level just below the pushing force of the first jack, at their respective component of this pushing force. The difference in pressure causes movement of the tube, which stops when the output and control pressures of the jacks in question are equilibrated. On this principle the movement of different jacks can be combined according to the desired direction of movement for the tubes.

In order to deform a tube, the jacks have to be moved independently of one another. The jacks may also be combined so as to create complex deformations of the tube.

The solenoid valves may be controlled jointly by means of a computer that runs a specific programme, typically capable of implementing the steps described in relation to FIGS. 4 to 6.

The position/movement sensors of the jacks make it possible to monitor the position of each tube in real time, by geometric calculations.

The individual controlling of the jacks 1, 2, by means of a computer, by the pushing force and/or the travel of each jack at the outer surface of the tube, makes it possible to generate movements of one of the tubes in relation to the other tube. The speed, direction and range of these movements are thus perfectly controlled. The bearing forces are maintained during the movement of the ends of the tube. When a desired position is reached, the system prevents further movement of the jacks.

At all times it is possible to correct the bearing pressure or the movement individually, i.e. separately on each jack, so as to optimise the overall clamping around the tube or tubes.

Figure 7A:
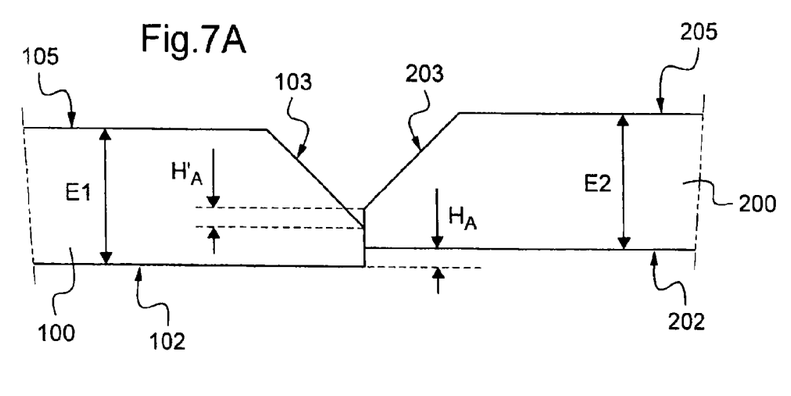
FIGS. 7A, 7B and 7C show, in longitudinal section, the end portions of two tubes, at different stages of their mutual positioning.
Figure 7B:
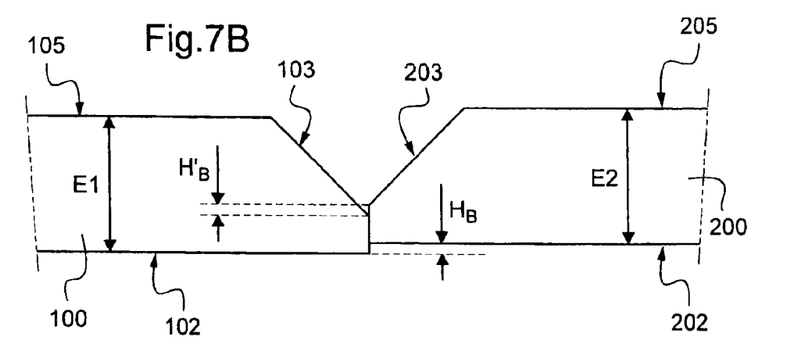
Figure 7C:
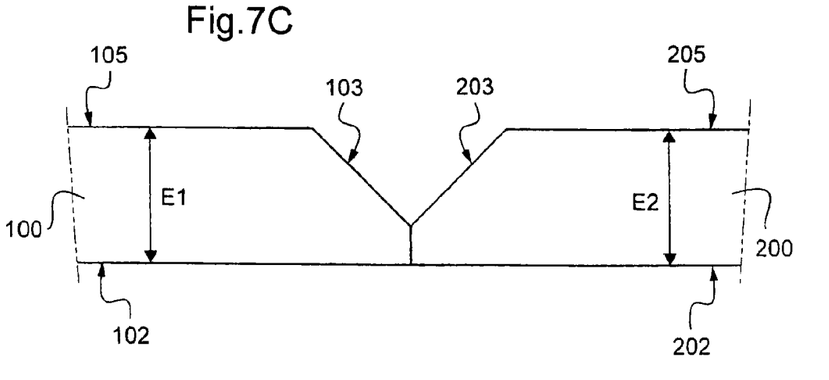

Reference is made to FIGS. 7A to 7C.

These Figures show a first tube 100 having, close to its end, radially, a thickness E1 which is substantially greater than the thickness E2 of a second tube 200 close to its proximal end, in the same radial position. This difference in thickness may result from the concentricity defects of the inner surface 102, 202 of the tubes relative to the outer surface 105, 205 and/or a variation in the thickness tolerances between the first tube 100 and the second tube 200.

FIG. 7A shows the first tube 100 and the second tube 200 after they have been roughly aligned by their outer surface, as the tubes are, for example, after the step 100 described above. The radial offset H'A is considerable and corresponds to the difference in thickness of the tubes in this radial position.

FIG. 7B shows the first tube 100 and the second tube 200 after they have been moved relative to one another so as to improve the alignment of their respective end faces. The radial offset H'B is significantly less than the initial radial offset H'A. Typically, a major part of the differences in coaxiality of the inner surfaces compared with the outer surfaces of the tubes 100, 200 has been successfully made up. Nevertheless a radial offset H'B remains, which may, under certain conditions, be greater than a maximum permitted Hilo value. This is the case for example when one of the tubes 100, 200 has a significantly more oval shape than the other tube, or the oval shapes of the tubes are angularly offset.

FIG. 7C shows that the tubes 100, 200, after the second tube has been locally deformed in order to reduce the radial offset that results after an operation of mutual movement of the tubes with a view to reducing overall the radial offset between the ends of the tubes 100, 200. The inner surfaces of the tubes 100, 200 are kept substantially in alignment with one another, or at least the final radial offset remains within limits that guarantee that the conditions for the subsequent welding operations will be good.

The invention may also relate to applications other than joining by welding, as long as it relates to the precise and reliable alignment of tubes, notably tubes of large dimensions and/or of considerable weight.

A method for the mutual positioning of tubes and a cramp that may be used to assist with the carrying out of the method have been described. The cramp described here may, however, be used more widely and notably for any process of aligning tubes, including those involving bringing the outer surfaces of the tubes into alignment. The cramp 40 may be used whenever at least one of the tubes on which it is mounted has to be moved while maintaining a clamping or engagement force on this tube.

The method described may also be seen as a method of positioning a first tube relative to a second tube at their ends, the end of the first tube being provided with a first bevel and a first substantially annular surface arranged close to its inner surface, the end of the second tube being provided with a second chamfer and a second substantially annular surface arranged close to its inner surface, said first and second annular surfaces defining a joint plane that is substantially perpendicular to the longitudinal axes of each of the said tubes, wherein a plurality of clamping jacks radially distributed around the first and second tube are used and controlled in order to move the second tube relative to the first tube parallel to the joint plane, as a function of a radial offset H, H' between the first and second annular surfaces, so as to ensure a maximum facing surface, known as the coincidence surface, of said annular surfaces.

The radial offset, or Hilo, is evaluated and monitored either visually or using specific detectors, and the offset is transmitted and processed by a central computer unit cooperating with and controlling the movement of all or some of the jacks.

The evaluation and monitoring of the Hilo may be carried out in situ and optionally in real time.

The automation of the process makes it possible to process very large numbers of geometric tube spacings within a limited timeframe and with very great precision.

Preferably, the radial offset is evaluated and monitored over the entire circumference, either at the outer edges of the annular surfaces defining the base of the bevels, or at the edges of the bevels with no root faces. For example, it may be decided to evaluate the offset at several points on the circumference which are regularly distributed over the circumference. This evaluation of the offset may be carried out using specific tooling.

The radial offset H may be evaluated and monitored relative to the inner walls of the tubes. The radial offset H' may also be evaluated and monitored relative to the bases of the respective bevels of the tubes. As the root faces of the bevels are generally of constant dimensions over the entire periphery of the tubes, such offsetting is reliable and easy to implement.

Prior to the movement of the second tube, the first end of the first tube may be clamped, the second tube may be roughly aligned with the first tube, and the second tube clamped in this position of alignment. Advantageously, the clamping is carried out at the outer walls of the tubes.

When the ends of the tubes are bevelled but have no root face, the radial offset H, H' between the end lines of the tubes may be reduced while distributing it angularly over the circumference of the end lines.

The alignment of the tubes may be carried out in a first period on the outer surfaces of the first and second tubes.

A longitudinal spacing of several millimeters may be provided between the end of the first and second tubes. This longitudinal spacing is predefined and selected by the skilled man as a function of the welding method used, when the alignment according to the invention is carried out with a view to welding the tubes. The joint plane is then located in the middle of the spacing, parallel to the facing annular surfaces, and perpendicular to the longitudinal axis of the tubes.

Once the ends of the tubes are clamped, the clamping jacks may be individually controlled so as to allow relative movement of the ends of the tubes while maintaining the clamping forces of the jacks on the tubes.

Advantageously, the first and/or second tube may be moved relative to one another until a coincidence surface of between about 20% and 100% of the annular surface of the first and/or second tube is obtained.

Moreover, the jacks remain locked in a clamping position and maintain the forces applied to the first and/or second tube when the movements of the tubes have ended. It is also possible to modify the radial offset H, H' locally by individually and separately adjusting the position of at least one of the jacks. Additionally, prior to the clamping of the first tube, the jacks may be positioned such that welding means are centred longitudinally on the end of the first tube or on the joint plane defined between the first and second tubes. This constitutes a longitudinal reference position for the tubes.

The invention is not limited to the embodiments described above solely by way of example but encompasses all the alternatives that might be envisaged by the skilled man. In particular:

The jacks used may be electric or any other type, even manually actuated and computer-aided.

The two flanges of the cramp 40 may be slidably mounted on one another. Then, in addition to mutually aligning the tubes, they may be moved closer to one another or held clamped against one another.

The jacks have been described as being regularly angularly distributed over their respective flange, but the arrangement could be different.

At least one of the flanges of the cramp 40 could be made in one piece.

The invention claimed is:

1. A device for mutually positioning a first tube relative to a second tube, comprising:
   a cramp including first and second homologous flanges mounted one on the other, the first flange supporting a first set of hydraulic jacks, the first set of hydraulic jacks being configured to allow a relative displacement of an end of the first tube, and the second flange supports a second set of hydraulic jacks, the second set of hydraulic jacks being configured to allow a relative displacement of an end of the second tube, the jacks of the first set of jacks and of the second set of jacks each being associated with a solenoid valve that can be controlled to supply the jack with fluid and with a proportional-type pressure regulator which can be made to control output of the jacks; and
   a computer,
   wherein each jack of the first set of jacks is associated with its own solenoid valve,
   wherein each jack of the second set of jacks is associated with its own solenoid valve,
   wherein the computer is configured to individually and independently control each solenoid valve associated with its respective jack, and
   wherein each jack has an internal movement sensor connected to a central control and processing unit capable of transmitting corresponding data to the computer in order to move and/or deform the first tube and the second tube so as to obtain optimal coincidence of end surfaces of the first tube and the second tube for the purpose of welding the end surfaces of the first tube and the second tube.

2. A device according to claim 1, further comprising a hydraulic generator comprising a plurality of hydraulic pump units, each jack of at least one of the first and second set of jacks being connected to a respective pump element.

3. A device according to claim 1, wherein the computer is configured to individually and independently control each solenoid valve associated to its jack such that a radial offset value between the tubes is below a predetermined value.

* * * * *